US006984682B2

(12) United States Patent
Polonka et al.

(10) Patent No.: US 6,984,682 B2
(45) Date of Patent: Jan. 10, 2006

(54) COLOR EFFECT PIGMENTS AND METHOD OF FORMING THE SAME

(75) Inventors: Jack Polonka, Peekskill, NY (US); Patrice Bujard, Reinach (CH); Natacha Bonnard Pillonel, Basel (CH); Fritz Herren, Duedingen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 572 days.

(21) Appl. No.: 10/103,072

(22) Filed: Mar. 21, 2002

(65) Prior Publication Data

US 2002/0137819 A1    Sep. 26, 2002

Related U.S. Application Data

(63) Continuation-in-part of application No. 09/477,395, filed on Jan. 4, 2000, now Pat. No. 6,369,147.

(60) Provisional application No. 60/117,008, filed on Jan. 25, 1999.

(51) Int. Cl.
*C08K 3/10*    (2006.01)

(52) U.S. Cl. ............... 524/413; 106/403; 106/417; 106/418; 106/436; 106/438; 106/439; 106/450; 523/171; 523/204; 523/210; 524/430; 524/431; 524/440

(58) Field of Classification Search ............... 106/403, 106/417, 418, 436, 438, 439, 450; 523/171, 523/204, 210; 524/413, 430, 431, 440
See application file for complete search history.

(56) References Cited

U.S. PATENT DOCUMENTS

| 3,087,827 | A |   | 4/1963  | Klenke et al. ............ 106/404 |
| 3,438,796 | A |   | 4/1969  | Hanke ...................... 106/308 |
| 4,328,042 | A |   | 5/1982  | Ostertag et al. .......... 106/291 |
| 5,091,010 | A |   | 2/1992  | Souma et al. ............. 106/403 |
| 5,135,812 | A |   | 8/1992  | Phillips et al. ............ 428/406 |
| 5,213,618 | A |   | 5/1993  | Souma et al. ............. 106/403 |
| 5,219,922 | A |   | 6/1993  | Steinberger et al. ...... 524/785 |
| 5,221,341 | A |   | 6/1993  | Franz et al. .............. 106/449 |
| 5,261,955 | A |   | 11/1993 | Nadkarni .................. 106/404 |
| 5,350,448 | A |   | 9/1994  | Dietz et al. ............... 106/441 |
| 5,364,467 | A |   | 11/1994 | Schmid et al. ............ 106/403 |
| 5,607,504 | A |   | 3/1997  | Schmid et al. ............ 106/403 |
| 5,733,364 | A |   | 3/1998  | Schmid et al. ............ 106/403 |
| 5,753,371 | A |   | 5/1998  | Sullivan et al. ........... 428/403 |
| 5,766,334 | A |   | 6/1998  | Hashizume et al. ...... 106/404 |
| 5,766,335 | A |   | 6/1998  | Bujard et al. ............. 106/291 |
| 5,855,660 | A | * | 1/1999  | Bujard et al. ............. 106/418 |
| 5,931,996 | A |   | 8/1999  | Reisser et al. ............ 106/404 |

FOREIGN PATENT DOCUMENTS

| DE | 4104310   | 8/1992  |
| EP | 0 328 906 | 10/1993 |
| EP | 0984043   | 3/2000  |
| JP | 10-110113 | 4/1998  |

* cited by examiner

*Primary Examiner*—Edward J. Cain
(74) *Attorney, Agent, or Firm*—Tyler A. Stevenson

(57) ABSTRACT

A metallic effect pigment including a metallic, corrosion resistant reflective core of reflectivity from 40% to 80%; having deposited thereupon at least one dielectric coating layer formed of at least one metal oxide, the metal oxide layer having been formed by deposition on the core by hydrolysis of a hydrolyzable metal salt in an strongly acidic aqueous medium, and thereafter full transformation into the oxide by calcination.

19 Claims, No Drawings

COLOR EFFECT PIGMENTS AND METHOD OF FORMING THE SAME

This is a divisional of U.S. application Ser. No. 09/477,395, filed Jan. 4, 2000 now issued as U.S. Pat. No. 6,369,147, which claims the benefit under 35 U.S.C. 119(e) of U.S. Provisional Application No. 60/117,008, filed Jan. 25, 1999.

The invention is directed to the field of color effect pigments. In the case of a painted surface, the effect pigment particles incorporated therein will, within the coating, align themselves parallel to the surface so that the colored paint surface, when illuminated by a fixed white light source may display different colors or will appear to have an iridescent color depending on the viewing angle. Therefore, effect pigments which are, for example, incorporated in a paint coat applied to the body of an automobile, increase the visual appeal and consequently the value of the vehicle.

Effect pigments have historically been manufactured by one of two methods. In the first method, as described for example in U.S. Pat. No. 3,438,796, a goniochromatic effect pigment that displays an angle-dependent color change and consists of a central opaque aluminium film symmetrically coated with a relatively thick layer of $SiO_2$, a transparent aluminium film and a thin $SiO_2$ film is formed by coating a substrate film alternately with $SiO_2$ and aluminium vapor under a high level of vacuum and scraping or otherwise removing the resulting multilayer structure from the substrate to provide pigment particles.

A refinement of the foregoing process is described, for example, in U.S. Pat. No. 5,135,812. This patent describes a process in which multiple layers are formed by vacuum deposition on either a soluble web which is then dissolved to provide a sheet of the multilayer structure which breaks into pieces upon dissolution of the web to provide pigment particles, or on a release layer provided on a flexible web. In the latter case, the multilayer structure is released and broken apart upon flexing of the web to provide particles that are then comminuted to the desired size. Both of these procedures require multiple coating and/or vacuum deposition steps which must be precisely controlled in order to provide a suitable effect pigment. Due to the number of steps involved in the process, the specialized equipment and precise process control that is required, the resulting pigments are extremely expensive.

The second of the two commonly employed methods for forming metallic effect pigments displaying goniochromatic properties is described, for example in U.S. Pat. No. 5,364,467. The process described therein involves the formation of multiple metal oxide layers directly onto metallic particle substrates by vapor phase decomposition of a corresponding volatile metal compound, i.e., carbonyls, halides and, in particular chlorides and alkoxides.

Colored pigments are also known from U.S. Pat. No. 4,328,042 that have metallic cores whose surface has been coated at least in part by iron oxide. The metallic cores, which must be capable of producing a metallic luster, are introduced into a fluidized bed reactor and preheated to a desired reaction temperature. The preheated metallic core particles such as copper and its alloys with zinc and/or tin, or aluminium and its alloys with copper, are then contacted by an iron pentacarbonyl vapor, which oxidizes to form iron oxide and carbon dioxide. The latter two procedures have some advantages as compared with the previous ones, but it is also necessary to control all process steps very carefully, so that these pigments are quite expensive, too.

JP-10/110113 (Nippon Chemical) discloses a process for making a pigment flake characterized in that a stainless steel flake is coated with a non-specified mixture of titanium compounds comprising oxides and hydroxides, which is deposited on the stainless steel flakes in an aqueous solution containing an inorganic salt of titanium. The inorganic salt is entirely dissolved into water, if necessary with the help of an acid in small quantity (for example in the case of basic titanyl sulfate). Titanium dioxide is partially formed upon calcination, the interference color depending on the drying and calcination temperature. However, this procedure does not lead to pigments coated with pure, crystalline titanium dioxide. The results are coloristically difficult to reproduce, too, and the pigments do not possess a satisfactory sedimentation behavior for example in liquid paint compositions.

U.S. Pat. No. 5,766,334 discloses colored titanium pigment flakes having a thin (25 to 200 nm thick) superficial oxide layer formed by oxidation. EP-A-0 328 906 discloses a process for coating metal flakes, including titanium and stainless steel flakes, with a coating of titanium dioxide that has been deposited by hydrolysis of a hydrolyzable organic titanate ester under specific conditions. In order the flakes not to dissolve into a strongly acidic aqueous medium, the deposition is effected in an organic medium at a pH of 4 to 8.

The obtained coatings, however, are in both cases not satisfactory uniform in thickness, and the coloristic properties (especially the chroma) do not match high expectations.

Pearlescent silicate pigments are also known that have silicate flakes having a layer of rutile titanium dioxide or iron oxide. One such pearlescent pigment is disclosed in U.S. Pat. No. 5,753,371 wherein the coated particles are made by dispersing C glass particles in an acidic aqueous medium containing ferric chloride, titanium tetrachloride or titanyl sulfate. A layer of tin oxide may optionally be deposited as a nucleating agent prior to the titanium oxide, in order rutile to be formed upon calcination. However, the colored pearlescent pigments of U.S. Pat. No. 5,753,371 (the teachings of which are incorporated herein by reference) have coloristic properties which do still not match satisfactory the high requirements in the field.

Methods involving the deposition of a metal oxide layer via liquid phase decomposition (hydrolysis) of a corresponding metal salt (i.e., sulfate or halide) are known per se and have been used to form luster, or pearlescent pigments which have translucent, non-reflective mica cores. However, such methods, described for example in U.S. Pat. No. 3,087,827 and U.S. Pat. No. 5,733,371, have not been considered suitable for forming effect pigments with reflective metallic cores in the highly acidic (pH of less than 4), aqueous solutions required by such processes. Problems associated with the coating of reflective metal cores with a metal oxide layer by hydrolysis of the corresponding metal salt are discussed, for example, in U.S. Pat. No. 5,213,618.

Surprisingly, applicants have discovered that by selecting certain metal cores and optionally treating them in such a way that they are rendered more corrosion resistant, inexpensive effect pigments having a simple metal oxide-metal-metal oxide structure but of excellent optical properties can be obtained in a more economical way by forming a coating layer of metal oxide on the surface of the metal core or substrate by hydrolysis of the corresponding inorganic metal salt under highly acidic conditions and subsequent calcination.

The metallic cores or substrates must display a reflectivity of 40% to 80% in order to produce optical variance in the resulting pigment and are suitably sufficiently resistant to aquatic corrosion to withstand immersion in highly acidic aqueous solutions (pH of 1.0 to 4.0), in the presence of the anions of metal salts, particularly chlorides. A convenient test for checking the resistance to corrosion is to immerse a polished plate of the metallic material into aqueous chlorohydric acid of pH 2 at 80° C. for 1 hour, whereby its reflectivity should not change by more than ±5%, and its thickness should not decrease by more than 1 μm, preferably not decrease by more than 0.1 μm. Suitable metals include transition metal elements and alloys thereof, preferably titanium, tantalum, zirconium, stainless steel or hastelloy (a nickel-based "super alloy"). Effect pigments based on titanium substrates are most preferred because of their surprisingly high sedimentation stability in paint media.

In view of the above-described problems and disadvantages associated with conventional processes for forming effect pigments, it is the object of the present invention to provide goniochromatic effect pigments that are formed by a process that is simple, reproducible, provides a high yield, requires no special processing equipment and results in a quality product that is relatively inexpensive to produce and has excellent coloristic properties.

Accordingly, the present invention relates to a effect pigment comprising:
(a) a core formed of a metallic material of reflectivity from 40% to 80%;
(b) optionally, a non-interferent layer of a layer formed of an oxide of a group 13 to group 15 element or a mixture thereof; and
(c) at least one dielectric layer consisting of one or more oxide of a metal selected from elements of groups 3 to 15 of the periodic system.

The groups are named according to the new IUPAC nomenclature. Preferred elements of groups 3 to 15 of the periodic system are Fe, Ti or Zr. The dielectric layer (c) is conveniently formed on the core by suspending flakes of core material in an aqueous solution of a corresponding metal salt under highly acidic conditions and at elevated temperatures, followed by calcination to eliminate substantially all hydroxy groups. The number of dielectric layers (c) is purposefully from 1 to 5, preferably from 1 to 3, most preferred 1 or 2.

It has surprisingly been found that the nature of the interface between the core (a) and the dielectric layer (c) is an important parameter. Preferably, the core (a) and the dielectric layer (c) are clearly distinct from each other, without any transition zone consisting of a mixture of core and dielectric or, when there is the same metal in the core and the dielectric, of compounds stoichiometrically different from the core and the dielectric. For example, there should be no lower metal oxides between a core consisting of a metal and a dielectric consisting of the same metal's oxide, such as $TiO_x$ between Ti and $TiO_2$ (0<x<2), for which reason a non-interferent layer (b) of a different metal oxide should preferably be present when the dielectric layer (c) comprises an oxide of the metal of the core (a). "Non-interferent" refers to the absence of visible optical interference phenomena.

Highly surprisingly, the application of a non-interferent layer (b) of a different metal oxide appears even to neutralize the negative effect of core metal oxides at or near the surface of the core (a). Thus, it is advantageously possible also to use superficially oxidized cores (a).

The presence of a non-interferent layer (b) is also preferred when the metal of the core (a) and the dielectric of the layer (c) are in such combination that they may undergo reactions, such as for example a redox reaction or the diffusion of core metal atoms into the dielectric oxide layer or vice versa, for example at the calcination temperature.

The non-interferent layer (b) may further also increase the core's corrosion resistance. On the other hand, the non-interferent layer (b) is purely optional when none of the above-mentioned goals is needed or desired.

The non-interferent layer (b) has a chemical composition different from the dielectric layer (c) and preferably comprises tin dioxide. Most preferably, (b) essentially consists of tin dioxide. Adequate thickness to avoid interference are from 0.1 nm to 20 nm, particularly less than 16.7 nm, preferably from 1 to 10 nm.

The instant effect pigments have a high gloss, attractive goniochromatic shifts generally with a high dark flop effect, as well as surprisingly vivid, saturated colors and a good hiding power. Optionally, the optical characteristics of the instant effect pigments may be further improved by oxidizing the metal of the reflective metallic core to build up thin non-interference oxide layer (i.e., $TiO_2$ layer) prior to deposition or by pickling the reflective metallic cores, a process in which an additive such as perchloric acid or sodium molybdenate is introduced into the suspension of metal particles prior to deposition of the metal oxide layer. In this case, it is highly recommended to apply a non-interferent layer (b) for the reasons discussed above.

The core is normally a particle in platelet form, the size of which is not critical per se and can be adapted to the particular use. Generally, the flakes have a length and a width each about from 2 to 200 μm, in particular about 5 to 50 μm, and thickness about from 1 to 5 μm, preferably from 1 to 2 μm, including any superficial oxide layer. Platelets are understood to be particles having two essentially flat and parallel surfaces, with an aspect ratio length to thickness of from 2:1 to 1000:1, preferably from 10:1 to 100:1, and a length to width ratio of from 3:1 to 1:1. The use of a too small a particle size will result in diffuse light scattering. Too large a particle size will interfere with the deposition of the metal oxide layer resulting in irregular deposition. Methods for forming such particles are well known. For example, to form suitable titanium flakes, ground titanium powder (approximately 37–44 μm (325 mesh) grade) is dispersed in a suitable dispersing fluid (e.g., mineral spirits) and wetting agent (e.g., stearic acid or oleic acid) and milled flat in a ball mill. The organic components are then removed from the flake surface by washing with solvents (e.g., cyclohexane and methyl chloride) with any residual organics being volatilized or burned off in a furnace at low temperatures (about 300° C.).

For producing a mixed interference/absorption effect pigment, the metal oxide of dielectric layer (c) is preferably a colored (selectively absorbing, not grey or black) oxide or colored mixed oxide of elements of groups 5 to 12. A most preferred metal oxide layer comprises $Fe_2O_3$. The method used to deposit the $Fe_2O_3$ layer on the titanium substrate is similar to that used to coat mica particles in the production of luster pigments and pearlescent pigments. Specifically the metal core particles are suspended in deionized water with a pH of 0 to 4, preferably 1.0 to 3.0, at a temperature of 50° C. to 90° C. At a lower pH $Fe_2O_3$ particulate may form in the suspension preventing deposition on the core. At a higher pH, a non-uniform coating thickness may be observed. An aqueous solution of metal salt, preferably $FeCl_3$, is added to the suspension to deposit the metal oxide layer. The pH can be maintained during the introduction of the aqueous solution by addition of an alkali such as NaOH.

For producing a pure interference effect pigment, the metal oxide of dielectric layer (c) is preferably a substantially colorless oxide of an element of groups 3 or 4. A most preferred metal oxide layer comprises $TiO_2$. The method used to deposit the $TiO_2$ layer on the titanium substrate is similar to that used to coat mica particles in the production of luster pigments and pearlescent pigments. Specifically the metal core particles are suspended in deionized water with a pH of 0 to 4, preferably 1.0 to 3.0, at a temperature of about 50° C. to 90° C. At a lower pH $TiO_2$ particulate may form in the suspension preventing deposition on the core. At a higher pH, a non-uniform coating thickness may be observed. An aqueous solution of metal salt, preferably $TiCl_4$, is added to the suspension to deposit the metal oxide layer. The pH can be maintained during the introduction of the aqueous solution by addition of an alkali such as NaOH.

Once the addition of the metal salt is completed and the desired metal oxide layer thickness is achieved, the metal flake suspension can be filtered and washed with deionized water, dried and calcined at a temperature of 100° C. to 900° C., preferably 400° C. to 600° C., especially about 450° C. to 500° C., for about 15 to 30 minutes, most preferably under a non-oxidizing atmosphere. At too high a temperature, the core metal flakes may oxidize or sinter together. At too low a temperature, the mixed hydroxides/oxides (oxide hydrates) of some metals such as iron are not fully calcined, and the transformation of others such as those of titanium to the preferred highest density oxide crystal lattice is incomplete.

To generate the appropriate colors, the metal oxide layer should have a physical thickness of 100 to 400 nm and an index of refraction of 2.0 to 3.2 for colored oxides and of 2.0 to 2.7 for colorless oxides. Individual metal oxide layers of such thickness cannot be deposited by vapor deposition in satisfactory homogeneity and uniformness. Thus, while the color shifting pigments formed in accordance with the prior art consist of multiple metal oxide layers, those formed in accordance with the present invention do not. The metal oxide layers have preferably a physical thickness of at least 150 nm, most preferred 250 to 400 nm.

Preferably, and particularly when forming a $Fe_2O_3$ or $TiO_2$ layer on a titanium core flake, a non-interfering layer of a protective metal oxide such as $SnO_2$ (below 1.0% by weight as Sn, corresponding to a thickness of less than 16.7 nm) is formed on the flake prior to the deposition of the $Fe_2O_3$ or $TiO_2$. The presence of the protective metal oxide layer improves the deposition and adherence of the $Fe_2O_3$ or $TiO_2$ layer to the flake surface by reducing the amount of colloidal $Fe_2O_3$ or $TiO_2$ and also converts the $TiO_2$ to rutile form. The $SnO_2$ is deposited on the flake, for example, by addition of a tin salt solution to the suspension prior to the addition of the aqueous solution of the titanium salt solution.

The invention accordingly also relates to a process for the preparation of an effect pigment according to above definition, comprising the steps of:
(1) hydrolyzing a compound of a metal selected from elements of groups 3 to 15 of the periodic system in an aqueous medium having a pH of 1.0 to 4.0, so that said metal is precipitated on the core in the form of its compounds, selected from oxides, hydroxides and mixed hydroxides/oxides; and
(2) heating the core with the precipitate of said metal thereon to a temperature of 100° C. to 900° C., so that substantially any hydroxides in the precipitate of said metal are converted into oxides and any water is eliminated.

The conversion is most preferably total. However, some hydroxide groups may still remain in the form of impurities in minor quantities (up to about 0.05 hydroxide group per atom of metal), as long as this does not affect the coloristic properties. Preferably, this quantity is from 0.001 to 0.02 hydroxide group per atom of metal.

The instant metallic cores or substrates display a reflectivity of 40% to 80%. A higher level of reflectivity may actually wash out and reduce the iridescent effect. The present effect pigments advantageously require only one dielectric layer of metal oxide to provide a metallic iridescent effect. This level of reflectivity is in contrast to conventional effect pigments which rely on an interference generated by passage of light through numerous layers of differing materials to provide the color shifting effect. Because light must pass through a number of layers to generate a color shift, such pigments require a highly reflective core, such as aluminium (or gold or silver) which has a reflectance of 90% or more.

Optionally, the effect pigments can nevertheless be provided with an additional, outermost semi-transparent light absorbing metal oxide layer (d) formed of, for example, $Fe_2O_3$, CoO, $CoTiO_3$, $Cr_2O_3$, $Fe_2TiO_5$ or a silicon suboxide $SiO_x$, wherein x is less than one and preferably about 0.2. Said light absorbing metal oxide layer absorbs at least a portion of all but certain wavelengths of light to provide an enhanced impression of the selected color. The $SiO_x$ layer may be formed by known methods, for example, by thermally decomposing $SiH_4$ in the presence of the coated metal flakes, in a fluidized bed reactor. The presence of the additional light absorbing layer can increase both the chroma and the color shift optical variance of the pigment. The additional light absorbing layer should have a thickness of 5 to 50 nm, preferably 5 to 30 nm. The effect pigments formed in accordance with the present invention may be further subjected to post treatment (surface modification) using any conventionally known method to improve the weatherability, dispersibility and/or water stability of a pigment.

The effect pigments of the present invention are suitable for use in imparting color to high molecular weight ($10^3$ to $10^8$ g/mol) organic materials (plastics), glass, ceramic products, cosmetic compositions, ink compositions and especially coating compositions and paints. The metallic effect pigments of the present invention may also be used to advantage for such purposes in admixture with transparent and hiding white, colored and black pigments, carbon black and transparent, colored and black luster pigments (i.e., those based on metal oxide-coated mica), and metal pigments, including goniochromatic interference pigments based on metallic or non metallic cores, platelet-shaped iron oxides, graphite, molybdenum sulfide and platelet-shaped organic pigments. The coloristic properties of the present effect pigments may also be altered by reacting said pigments in hydrogen, carbon monoxide, ammonia or a combination thereof to form a surface layer of reduced metal (for example Fe or Ti) oxide or nitride, which surface layer will cause the darkening of the pigment color.

A paint or coating composition according to the invention may comprise a film-forming vehicle compounded with the above described metallic effect pigment. The film-forming vehicle of the inventive coating composition is not particularly limiting and any conventional resin can be used according to the intended application of the inventive coating composition. Examples of suitable film-forming vehicle resins include synthetic resins such as acrylic resins, polyester resins, resin mixtures of an acrylic resin and cellulose acetate butyrate referred to as CAB hereinbelow, CAB-grafted acrylic resins, alkyd resins, urethane resins, epoxy resins, silicone resins, polyamide resins, epoxy-modified alkyd resins, phenolic resins and the like as well as various kinds of natural resins and cellulose derivatives. These film-forming vehicle resins can be used either singly or in combinations of two or more according to need. If necessary, the above named film-forming vehicle resins are used as combined with a curing agent such as melamine resins, isocyanate compounds, isocyanate compounds having a block-wise structure, polyamine compounds and the like.

In addition to the above described film-forming vehicle resins, chromatic-color metal flake pigments and colored pigments of other types optionally added to the composition, the coating composition of the invention can be admixed with various kinds of additives conventionally used in coating compositions including, for example, surface conditioning agents, fillers, siccatives, plasticizers, photostabilisers, antioxidants and the like according to need.

The form of the inventive coating composition is not particularly limiting and includes dispersions in an organic solvent, aqueous dispersions, powders and emulsions. The process for film-forming of the inventive coating composition can be performed by drying at room temperature, curing by baking and curing by the irradiation with ultraviolet light or electron beams without particular limitations.

When the inventive coating composition is in the form of a dispersion in an organic solvent, the solvent suitable therefor is not particularly limiting and includes those organic solvents used conventionally in solution-type coating compositions. Examples of suitable organic solvents include aromatic hydrocarbon solvents such as toluene, xylene and the like, olefin compounds, cycloolefin compounds, naphthas, alcohols such as methyl, ethyl, isopropyl and n-butyl alcohols, ketones such as methyl ethyl ketone and methyl isobutyl ketone, esters such as ethyl acetate and butyl acetate, chlorinated hydrocarbon compounds such as methylene chloride and trichloroethylene, glycol ethers such as ethylene glycol monoethyl ether and ethylene glycol monobutyl ether, glycol monoether monoesters such as ethylene glycol monomethyl ether acetate and ethylene glycol monoethyl ether acetate and so on.

The coating composition of the present invention can be prepared via any method used for the preparation of conventional coating compositions of the respective type. The coating composition of the invention can be applied to any substrate material including, for example, metal, wood, plastic, glass, ceramic and the like without particular limitations. The coating method is also not particularly limiting and any conventional coating methods can be undertaken including, for example, air-spray coating, airless coating, electrostatic coating, roll-coater coating and the like. The coating can be applied using a one-coat method, two-coat method and so on depending on the intended application of the coated articles.

An ink composition of the present invention contains a film-forming material and a coloring agent comprising the above described metallic effect pigment. All film-forming materials used to form conventional ink compositions may be used to form the ink compositions of the present invention without particular limitation. Examples of film-forming materials suitable for such purposes include, for example, synthetic resins such as phenolic resins, alkyd resins, polyamide resins, acrylic resins, urea resins, melamine resins and polyvinyl chloride resins, natural resins such as Gilsonite, cellulose derivatives and vegetable oils such as linseed oil, tung oil and soybean oil. Optionally, two or more kinds of such film-forming materials may be used in combination according to the intended application of the ink composition.

In addition to the above described film-forming material, chromatic-color metal flake pigment and colored pigments optionally added according to need, the ink composition of the present invention can be admixed with various kinds of additives conventionally used in ink compositions such as waxes, plasticizers, dispersing agents and the like according to need. Further, the form of the inventive ink composition is not particularly limited and includes solutions in an organic solvent, aqueous solutions and aqueous emulsions.

When the inventive ink composition is in the form of a dispersion in an organic solvent, various kinds of organic solvents can be used therefor without particular limitations and include those used in conventional solution-type ink compositions. Examples of suitable organic solvents include, for example, aromatic hydrocarbon solvents such as toluene and xylene, olefin compounds, cycloolefin compounds, naphthas, alcohols, such as methyl, ethyl, isopropyl and n-butyl alcohols, ketones such as methyl ethyl ketone and methyl isobutyl ketone, esters such as ethyl acetate and butyl acetate, chlorinated hydrocarbon compounds such as methylene chloride and trichloroethylene glycol ethers such as ethylene glycol monoethyl ether and ethylene glycol monobutyl ether, glycol monoether monoesters such as ethylene glycol monomethyl ether acetate and ethylene glycol monoethyl ether acetate and so on.

The inventive ink composition can be prepared via any method used in the preparation of prior art to form conventional ink compositions of the respective types. The ink composition of the invention can be used in printing in any conventional manner such as screen printing, rotogravure, bronze printing and flexographic printing.

A colored molding material in accordance with the present invention contains a plastic resin and, as the coloring agent, the above-described metallic effect pigment. The plastic resin which constitutes the principal ingredient of the inventive molding compound is not particularly limited and any plastic resins conventionally used in the prior art for molding of shaped articles can be employed. Examples of such plastic resins include polyvinyl chloride resins, plasticized polyvinyl chloride resins, polyethylene resins, polypropylene resins, ABS resins, phenolic resins, polyamide resins, alkyd resins, urethane resins, melamine resins and the like.

Optionally, the plastic resin of the inventive molding compound is compounded with other chromatic-color metal flake pigments and/or with colored pigments of other types to further enhance the aesthetic coloring effect. The inventive molding compound of plastic resin may also optionally contain various kinds of fillers and other additives conventionally used in plastic resin-based molding compounds of the prior art. Various forms of shaped articles can be prepared from the inventive molding compound by a known method such as by extrusion molding and injection molding.

Thus, the invention also pertains to a composition comprising a high molecular weight organic material and a coloristically effective amount of an instant effect pigment, as well as to the use of the instant effect pigments for pigmenting a high molecular weight organic material, in particular an automotive coating. The instant pigment is preferably used in amounts of from 0.01 to 30% by weight, based on the weight of the high molecular weight organic material to be pigmented.

The following examples illustrate the present invention in more detail, without being intended to limit the scope of the invention in any manner. Percentages are given by weight.

EXAMPLE 1

200 g of tantalum flake powder (avg. diameter of 8 $\mu$m) is suspended in 200 ml of deionized water by fast stirring (280 r.p.m.). The slurry is kept at a constant temperature of 75° C. and at a pH of 1.4 (by addition of dilute aqueous nitric acid). A 30% solution of $SnCl_4.5\ H_2O$ in water is then added for 8 min at a speed of 0.4 ml/min during which time the pH is kept constant at 1.4 by addition of a 35% aqueous NaOH solution. Then a 40% solution of $TiCl_4$ in water is added dropwise to the slurry at the same pH (kept constant by continuous addition of 35% aqueous NaOH) and hydrolyzed over a period of 8 to 10 hours until a total amount of 97.2 gr. of $TiCl_4$ is added. The flake powder, coated with hydrolyzed $TiO_2$, is filtered and washed with water and dried. Afterwards, the material is calcined at 450° C. for 15 minutes under non oxidizing atmosphere. The final product is an iridescent blue with a red-violet specular color.

EXAMPLE 2

120 g of stainless steel flake powder (avg. diameter of 32 μm) is suspended in 250 ml of deionized water at the pH of 2.4 and a temperature of 75° C. A 40% solution of $TiCl_4$ in water is then added dropwise to the slurry at the same pH (kept constant by continuous addition of 35% aqueous NaOH) and hydrolyzed over a period of 5 to 6 hours until a total amount of 43.2 gr. of $TiCl_4$ is added. There is little to no sign of corrosion on the metal flake. After coating, the material is filtered, washed and calcined as in Example 1. The final material is gold with a silver off-specular color.

EXAMPLE 3

Titanium flakes are prepared by milling 130 gr. of ™TI-050 metal powder (from Micron Metals) in a ball mill containing 750 ml mineral spirits (b.p. ~200° C.), 10 ml oleic acid and 5 kg stainless steel beads (diameter ~1 cm) for 24 h at 60 rpm. The organics are then removed by reslurrying in cyclohexane, filtration followed by reslurry in a buffer solution at pH 10/60° C., filtering and washing. The so obtained flakes are heated to 350° C. for 30 min to burn off last traces of organics.

EXAMPLE 4

100 g of titanium flake powder (avg. diameter of 40 μm) is suspended in 200 ml of deionised water at 75° C. and pH 1.4. A 30% solution of $SnCl_4.5\ H_2O$ in water is then added for 8 min at a speed of 0.4 ml/min, during which time the pH is kept constant at 1.4 by addition of a 35% aqueous NaOH solution. Then, a 40% solution of $TiCl_4$ in water is added at a rate of 0.3 ml/min to the slurry at the same pH (kept constant by continuous addition of 35% aqueous NaOH) and hydrolyzed over a period of about 10 hours until green flakes are obtained. The material is filtered, washed salt free with water, dried and finally calcined under non oxidizing atmosphere for 15 min at 450° C. The final material is an iridescent green with a light blue-green off-specular color.

EXAMPLE 5

100 g of titanium flake powder with an average diameter of 25 μm is suspended in 200 ml of water and coated under the same conditions as in Example 1, with the differences of the pH being 1.6 and having 43.2 g of $TiCl_4$ added to the slurry. After coating, the material is filtered, washed and calcined as in Example 1. The final material is green with a blue-green off-specular color.

EXAMPLE 6

100 g of titanium flake powder with an average diameter of 25 μm is suspended and coated under the same conditions as in Example 4 with the differences of the pH being 1.8 and having 28.8 g of $TiCl_4$ added to the slurry and hydrolyzed over a period of about 4–5 hours. After coating, the material is filtered, washed and calcined as in Example 1. The final material is red-violet with a gold off-specular color.

EXAMPLE 7

300 g of titanium flake powder (avg. diameter of 30 μm) is suspended in 600 ml of water by fast stirring. The slurry is kept at a constant temperature of 75° C. and at a pH of 3.2. A solution of 70.2 g of $FeCl_3$ in 500 ml of water is added to the slurry at the same pH (kept constant by addition of a 35% aqueous NaOH solution) and hydrolyzed over a period of 8 to 10 hours. The flake powder, coated with hydrolyzed $Fe_2O_3$, is filtered and washed with water. Afterwards, the material is calcined at 450° C. for 15 minutes under nitrogen. The final product is russet in color and contains some colloidal iron oxide.

EXAMPLE 8

Example 7 is repeated, with the difference that a 30% solution of $SnCl_4.5\ H_2O$ in water is added at 0.2 ml/min for 8 min prior to $FeCl_3$. After 7 hours of hydrolysis, a russet colored product is obtained which contains much less colloidal material than the product of Example 7.

EXAMPLE 9

Example 8 is repeated, with the difference that 48.0 g of $FeCl_3$ are hydrolyzed in 4½ hours. A bronze/gold colored product containing little colloidal material is obtained.

EXAMPLES 10–12

Examples 7–9 are repeated at a pH of 3.6, with similar results.

EXAMPLE 13

12.0 g of the pigment obtained according to Example 4 and 8.0 g of Solvesso 150 are dispersed together in a disperser (®Dispermat) for 60 minutes at 800 rpm. Then,

| | |
|---|---|
| 40.0 g | of a paint base consisting of |
| 12.0 g | of CAB solution consisting of |
| 41.0 parts by weight | of 20% cellulose acetobutyrate in butanol/ xylene 2:1 (®CAB 531.1, Eastman Chem.) |
| 1.5 parts by weight | of zirconium octoate, |
| 18.5 parts by weight | of ®Solvesso 150* (ESSO), |
| 21.5 parts by weight | of butyl acetate and |
| 17.5 parts by weight | of xylene; |
| 16.0 g of polyester resin | (®Dynapol H700, Dynamit Nobel; and |
| 12.0 g of melamine resin | (®Maprenal MF 650, Hoechst) | are added and the paint is further dispersed in the Dispermat for 80 min at 800 rpm. The paint is applied with an automatic spraying apparatus at a wet film thickness of ~20 μm. After flashing off at room temperature for 30 min, ~50 μm of a clear coat consisting of

| | |
|---|---|
| 29.60 g | acrylic resin ®URACRON 2263 XB, 50% in xylene/butanol (Chemische Fabrik Schweizerhalle), |
| 5.80 g | melamin resin ®CYMEL 327, 90% in isobutanol, |
| 2.75 g | butyl glycol acetate, |
| 5.70 g | xylene, |
| 1.65 g | n-butanol, |
| 0.50 g | silicone oil, 1% in xylene, |
| 3.00 g | ®TINUVIN 900, 10% in xylene (Ciba), and |
| 1.00 g | ®TINUVIN 292, 10% in Xylene (Ciba) | is applied by spraying. After 30 min flash off time, the paint is cured at 130° C. for 30 min. A brilliant green shade with a strong metallic effect and a blue-green off-specular color is obtained.

We claim:

1. An effect pigment comprising:
   (a) a core formed of a metallic material of reflectivity from 40% to 80% selected from the group consisting of titanium, tantalum, zirconium, stainless steel and hastelloy;
   (b) a non-interferent layer comprising tin dioxide which is arranged between layers (a) and (c); and
   (c) at least one dielectric layer consisting of one or more oxide of a metal selected from iron, titanium and zirconium.

2. The pigment of claim 1, wherein the metal oxide of dielectric layer (c) is a coloured oxide or coloured mixed oxide of iron and has a physical thickness of 100 to 400 nm and an index of refraction of 2.0 to 3.2.

3. The pigment of claim 2, wherein said thickness is 250 to 400 nm.

4. The pigment of claim 2, wherein said metal oxide is ferric oxide.

5. The pigment of claim 1, wherein the metal oxide of dielectric layer (c) is a substantially colourless oxide of titanium or zirconium and has a physical thickness of 100 to 400 nm and an index of refraction of 2.0 to 2.7.

6. The pigment of claim 5, wherein said thickness is 250 to 400 nm.

7. The pigment of claim 5, wherein said metal oxide is titanium dioxide.

8. The pigment of claim 1, wherein the metal oxide of layer (b) has a thickness of from 0.1 nm to 20 nm.

9. The pigment of claim 1, further comprising a colour absorbing layer (d) further from said core than said dielectric layer, wherein the colour absorbing layer comprises at least one compound selected from the group consisting of $Fe_2O_3$, $CoO$, $CoTiO_3$, $Cr_2O_3$, $Fe_2TiO_5$ or $SiO_x$, wherein x is less than one, and has a thickness of 5 to 50 nm.

10. The pigment of claim 1, wherein said core is titanium.
11. The pigment of claim 2, wherein said core is titanium.
12. The pigment of claim 5, wherein said core is titanium.
13. The pigment of claim 8, wherein said core is titanium.
14. The pigment of claim 9, wherein said core is titanium.
15. The pigment of claim 10, wherein said core (a) is superficially oxidized to a depth of from 0.1 nm to 20 nm.
16. The pigment of claim 1, wherein said effect is a goniochromatic effect.
17. A composition comprising a high molecular weight organic material and a coloristically effective amount of an effect pigment according to claim 1.
18. A composition of claim 17, which is an automotive coating.
19. A process for pigmenting a high molecular weight organic material, wherein an effect pigment according to claim 1 is incorporated into said material.

* * * * *